UNITED STATES PATENT OFFICE.

JENS DEDICHEN, OF BERLIN, GERMANY, ASSIGNOR TO ACTIEN GESELL-SCHAFT FÜR ANILIN FABRICATION, OF BERLIN, GERMANY.

PROCESS OF MAKING BLACK POLYAZO DYES.

SPECIFICATION forming part of Letters Patent No. 717,550, dated January 6, 1903.

Application filed June 13, 1902. Serial No. 111,468. (No specimens.)

*To all whom it may concern:*

Be it known that I, JENS DEDICHEN, of Berlin, in the Kingdom of Prussia, German Empire, have invented new and useful Improvements in Processes of Making Black Polyazo Dyestuffs; and I do hereby declare that the following is a full, clear, and exact description thereof, which will enable others skilled in the art to which it appertains to make and use the same.

In the German Patent No. 97,437 there is described the manufacture of polyazo dyestuffs represented by the formula

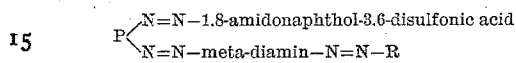

in which P means a paradiamin, and R the radical, of a diazo compound. These dyestuffs are produced by allowing a diazo compound to react with a mixed disazo dyestuff, such as may be obtained by combining either in an alkaline solution or in a solution rendered acid by means of acetic acid a tetrazotized paradiamin with one molecular proportion of 1.8-amidonaphthol-3.6-disulfonic acid and combining thereupon the intermediate product thus formed in an alkaline solution with metaphenylenediamin or with a homologous diamin.

It is known that when following the directions given in the above patent the reaction is performed, so as to make the radical of the diazo compound enter into the benzene nucleus of the metadiamin, while the naphthalene nucleus of the amidonaphthol-disulfonic acid remains intact. There is no doubt of this disposition being caused by the fact that the formation of the intermediate product above referred to takes place in an alkaline solution or yet in a solution free from mineral acid.

I have now made the unexpected discovery that coloring-matters absolutely different from the products described in the German Patent No. 97,437 are obtained if diazo compounds are allowed to combine with mixed disazo dyestuffs, the intermediate products of which had been formed in the presence of mineral acid. It seems that under these conditions the diazo compound instead of entering into the benzene nucleus reacts with the naphthalene nucleus, occasioning thus the formation of new coloring-matters. If, for instance, diazobenzene is allowed to react with the mixed disazo dyestuff derived from benzidin—1.8-amidonaphthol-3.6-disulfonic acid and metaphenylenediamin—a dark violet dyestuff will be obtained when following the directions given in the German Patent No. 97,437 to the formation of the intermediate product, while the isomeric product obtained according to the prescriptions of the present demand forms a greenish-black dyestuff.

To further illustrate my invention, I give the following example. The parts are by weight: 18.4 parts of benzidin are tetrazotized in the usual way by means of fourteen parts of sodium nitrite and ninety parts of hydrochloric acid, (specific gravity 12° Baumé.) To the solution obtained is then slowly run an aqueous solution of the neutral sodium salt of 1.8-amidonaphthol-3.6-disulfonic acid, prepared by dissolving thirty-two parts of the said acid in water on addition of the theoretical amount of sodium carbonate. The mixture is then stirred until the combination is complete, the intermediate product separating in the form of a black precipitate. A solution containing 10.8 parts of metaphenylenediamin is then added thereto, and the mass is rendered alkaline by the addition of forty-five parts of calcined sodium carbonate. Stirring is continued for some hours more and a diazo solution obtained by diazotizing in the well-known way eleven parts of anilin by means of eight and one-half parts of sodium nitrite, and sixteen parts of hydrochloric acid is added thereto. After stirring for some hours more the mass is heated up and the polyazo dyestuff is precipitated by means of common salt. It produces on unmordanted cotton from a bath containing soap or common salt greenish-black shades of great intensity.

The result is not materially changed if for benzidin another paradiamin—for instance, tolidin, dianisidin, &c.—or if for the metaphenylenediamin employed a homologous diamin is substituted. Likewise diazobenzene may be replaced by another appropriate diazo compound.

Having thus described my invention and in what manner the same is to be performed, what I claim as new is—

The process for the manufacture of black polyazo dyestuffs, said process consisting in allowing a diazo compound to react on a mixed disazo dyestuff represented by the formula:

$$\text{Paradiamin} \begin{cases} \text{1.8-amidonaphthol-3.6-disulfonic acid} \\ \text{metadiamin} \end{cases}$$

obtained by combining in the presence of free mineral acid the tretrazo compound derived from a paradiamin with 1.8-amidonaphthol-3.6-disulfonic acid and combining the intermediate product thus formed in an alkaline solution with a metadiamin.

In witness whereof I have hereunto signed my name, this 28th day of May, 1902, in the presence of two subscribing witnesses.

JENS DEDICHEN.

Witnesses:
HENRY HASPER,
WOLDEMAR HAUPT.